United States Patent [19]

Radway et al.

[11] Patent Number: 4,738,690
[45] Date of Patent: Apr. 19, 1988

[54] METHOD OF REMOVING ENTRAINED PARTICLES FROM FLUE GAS AND COMPOSITION OF MATTER

[75] Inventors: Jerrold E. Radway, Lakeside, Calif.; Robert P. Bennett, Bridgewater, N.J.

[73] Assignee: Gus, Inc., Dallas, Tex.

[21] Appl. No.: 917,260

[22] Filed: Oct. 8, 1986

Related U.S. Application Data

[63] Continuation of Ser. No. 717,330, Mar. 29, 1985, abandoned.

[51] Int. Cl.$^4$ ............................ B03C 3/01; B01D 53/32
[52] U.S. Cl. ................................................... 55/5; 55/6; 55/73; 55/107; 55/134; 502/81; 502/83
[58] Field of Search ............................................ 55/5-8, 55/10, 107, 122, 134; 502/81, 83

[56] References Cited

U.S. PATENT DOCUMENTS

| | | | |
|---|---|---|---|
| 1,016,476 | 2/1912 | Cottrell | 55/5 X |
| 1,441,713 | 1/1923 | Prosser | 55/5 |
| 1,446,778 | 2/1923 | Witte | 55/5 |
| 1,544,210 | 6/1925 | Bierce | 502/81 |
| 2,377,577 | 6/1945 | Ruthruff | 502/81 X |
| 2,477,386 | 7/1949 | McCarter | 502/83 |
| 2,586,852 | 2/1952 | Morrell | 502/81 |
| 2,602,734 | 7/1952 | Hedberg et al. | 55/10 |
| 2,746,563 | 5/1956 | Harlow | 423/215.5 |
| 3,028,437 | 4/1962 | Schick | 502/83 X |
| 3,284,990 | 11/1966 | Örne | 55/5 |
| 3,503,704 | 3/1970 | Marks | 55/8 X |
| 3,523,407 | 8/1970 | Humbert | 55/106 |
| 3,704,329 | 11/1972 | Rindtorff et al. | 502/81 X |
| 3,704,569 | 12/1972 | Hardison et al. | 55/5 X |
| 3,722,178 | 3/1973 | Aaland et al. | 55/5 X |
| 3,993,429 | 11/1976 | Archer | 431/5 |
| 4,042,348 | 8/1977 | Bennett et al. | 55/5 |
| 4,043,768 | 8/1977 | Bennett et al. | 55/5 |
| 4,070,424 | 1/1978 | Olson et al. | 55/5 X |
| 4,113,447 | 9/1978 | Bennett et al. | 55/5 |
| 4,147,521 | 4/1979 | Albanese | 55/5 |
| 4,177,043 | 12/1979 | Albanese | 55/5 |
| 4,208,192 | 6/1980 | Quigley et al. | 55/5 |
| 4,299,730 | 11/1981 | Sommer et al. | 502/81 X |
| 4,325,711 | 4/1982 | Kober et al. | 55/5 |
| 4,329,257 | 5/1982 | Sommer et al. | 502/81 X |
| 4,333,746 | 6/1982 | Southam | 55/5 X |

*Primary Examiner*—Robert Spitzer
*Attorney, Agent, or Firm*—Harry C. Post, III

[57] ABSTRACT

A composition of matter is used to treat particles entrained in flue gas. The composition comprises a caustic liquid to adjust the resistivity of the entrained particles. An inert particulate matter supports the caustic liquid to inhibit the chemical action of the caustic liquid until used to adjust the resistivity of the entrained particles. The entrained particles are removed from the flue gas by choosing a caustic liquid to adjust the resistivity of the entrained particles. The caustic liquid is supported on inert particulate matter to inhibit the chemical action of the caustic liquid. The supported caustic liquid is supplied to untreated flue gas at a temperature sufficient to separate the caustic liquid from the inert particulate matter. The separated caustic liquid is mixed with the entrained particles so as to coat the entrained particles. The coated particles are then passed through an electrostatic precipitator to remove them from the flue gas.

19 Claims, No Drawings

METHOD OF REMOVING ENTRAINED PARTICLES FROM FLUE GAS AND COMPOSITION OF MATTER

This is a continuation of copending application Ser. No. 717,330, filed on Mar. 29, 1985, now abandoned.

Electrostatic precipitators have been used for many years to remove entrained particles from flue gas. Recently, the entrained particles have been coated with an acid to adjust the resistivity of the particles to enhance the operation of such precipitators. This coating may occur from the liquid acid being injected directly into the flue gas; as described in U.S. Pat. Nos. 2,602,734 and 3,284,990; or may occur from a gas, such as sulfur trioxide, being injected into the flue gas for mixing with water to provide the coating acid, as described in U.S. Pat. Nos. 2,602,734; 2,746,563; 3,523,407; 3,993,429; 4,043,768; 4,177,043; 4,333,746; and 4,325,711. Further, there is described in U.S. Pat. Nos. 4,042,348 and 4,113,447 the advantages of providing the acid coating on the particles to adjust their resistivity to between $10^8$ and $10^{10}$ ohm-centimeters. Thus, it is well known to coat the entrained particles with an acid prior to passing the flue gas through the electrostatic precipitator. However, since the liquid acid is caustic and the acid forming gas is highly reactive, they are exceedingly hazardous to persons working with them, they require special equipment for their use at the job site, and, since the liquid acid is not made at the job site, special equipment is required to transport it to and from the job site.

Accordingly, it is an object of the present invention to provide a composition of matter to treat particles entrained in flue gas that minimizes hazards to persons handling the composition, that minimizes special equipment requirements for using the composition at the job site, and that minimizes special equipment requirements for transporting the composition to and from the job site.

Further, it is an object of the present invention to provide a method of removing entrained particles from flue gas that minimizes hazards to persons handling the composition, that minimizes special equipment requirements at the job site and that minimizes special equipment requirements for transporting materials to and from the job site.

In accordance with the invention, a composition of matter is used to treat particles entrained in flue gas. A caustic liquid is used to adjust the resistivity of the entrained particles. Inert particulate matter supports the caustic liquid while inhibiting the chemical action of the caustic liquid until used to adjust the resistivity of the entrained particles. The inert particulate matter supporting sufficient liquid to adjust the resistivity of the entrained particles.

Further, in accordance with the invention, a method is used to remove entrained particles from flue gas. The entrained particles are removed from the flue gas by choosing a caustic liquid to adjust the resistivity of the entrained particles. The caustic liquid is supported on inert particulate matter to inhibit the chemical action of the caustic liquid. The inert particulate matter supporting sufficient caustic liquid to adjust the resistivity of the entrained particles. The supported caustic liquid is supplied to untreated flue gas at a temperature sufficient to separate the caustic liquid from the inert particulate matter. The separated caustic liquid is mixed with the entrained particles so as to coat the entrained particles. The coated particles are then passed through an electrostatic precipitator to remove them from the flue gas.

The caustic liquid chosen to adjust the resistivity of the entrained particles may be any of those previously identified. The preferred caustic liquid is one or more acids selected from the group consisting of sulfuric and phosphoric acids. The sulfuric acids used may be any dibasic acid from sulfur dioxide; such as, $H_2SO_4$; $H_2SO_4$—$H_2O$; $H_2SO_4$—$2H_2O$; $H_2SO_4$—$xHO$; and $H_2SO_4$—$xSO_3$. The phosphoric acids used may be any acid of phosphorus oxide by addition to water; such as: $HPO_3$; $H_4P_2O_7$; $H_3PO_4$; $H_3P_4O_{10}$; and $H_5P_3O_{10}$.

The inert particulate matter to support the caustic liquid and to inhibit the chemical action of the caustic liquid until used to adjust the resistivity of the entrained particles may be any powder that is inert relative to the caustic liquid and to the environment. The preferred particulate matter is one or more solid powders selected from the group consisting of calcium silicate, diatomaceous earth, vermiculite, magnesium silicate, sodium montmorillonite and carbon black. Further, the preferred particulate matter supports the caustic liquid by adsorption. Further, the preferred particulate matter supports the caustic liquid in a weight ratio of particulate matter to caustic liquid between 1:2 and 2:1 and, more preferred, in a weight ratio of particulate matter to caustic liquid between 1:2 and 1:1. Further, the preferred particulate matter is a powder with an average particle size of less than 100 screen mesh.

A composition of matter having caustic liquid supported by inert particulate matter was tested in a lignite-burning 575 megawatt tangentially-fired Combustion Engineering boiler with particulate matter being removed from the flue gas by Research Cottrell electrostatic precipitators. The flue gas is routinely treated with an acidic sodium bisulfate solution as described in U.S. Pat. No. 4,113,447 to enhance removal of the particulate matter with the precipitators when the flue gas is passed through the precipitators. The composition of matter made in accordance with this invention was prepared by mixing in a ribbon blender with a spray bar 35.0% diatomaceous earth, 60.0% sulfuric acid and 5.0% water. The composition was injected into the boiler at a flue gas temperature of approximately 1040° C. The existing flue gas conditioning system was discontinued and powdered feed performance monitored by resistivity measurements. At a powder feed of 0.0 kilograms/hour, there was a resistivity of $5.8 \times 10^{10}$ ohm-centimeters and a unit load of 560–570 megawatts. At a powder feed of 79.5–90.9 kilograms/hour, there was a resistivity of $6.3 \times 10^{10}$ ohm-centimeters and a unit load of 540–550 megawatts.

The composition of matter made in accordance with this invention may be injected into the boiler at a flue gas temperature of between 120° C. and 1,200° C. as demonstrated by the temperatures and weight loss shown in the following examples.

The following examples are presented to illustrate the practice of the invention and not as an indication of the limits or scope thereof.

EXAMPLE I

The composition of matter was prepared by placing in a plastic bag 35.0 grams of powdered diatomaceous earth with an average particle size of less than 325 screen mesh, sold under the name Celite 266 by Johns-Manville. While agitating the particulate matter in the bag, 65.0 grams of 93% concentrated sulfuric acid ($H_2$ SO₄) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 60.9% by 315° C.

EXAMPLE II

The composition of matter was prepared by placing in a plastic bag 40.0 grams of powdered vermiculite with an average particle size of less than 100 screen mesh. While agitating the particulate matter in the bag, 60.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 33.7% by 290° C., a weight loss of 43.6% by 618° C., a weight loss of 54.2% by 843° C., and a weight loss of 60.9% by 1000° C.

EXAMPLE III

The composition of matter was prepared by placing in a plastic bag 30.0 grams of powdered vermiculite with an average particle size of less than 100 screen mesh. While agitating the particulate matter in the bag, 70.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 21.4% by 180° C., a weight loss of 39.4% by 330° C., a weight loss of 53.8% by 848° C., and a weight loss of 68.2% by 925° C.

EXAMPLE IV

The composition of matter was prepared by placing in a plastic bag 50.0 grams of powdered diatomaceous earth with an average particle size of 150 screen mesh, sold under the name Celite 273 by Johns-Manville. While agitating the particulate matter in the bag, 50.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 47.4% by 270° C.

EXAMPLE V

The composition of matter was prepared by placing in a plastic bag 45.0 grams of powdered diatomaceous earth with an average particle size of 150 screen mesh, sold under the name Celite 273 by Johns-Manville. While agitating the particulate matter in the bag, 55.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 53.3% by 290° C.

EXAMPLE VI

The composition of matter was prepared by placing in a plastic bag 35.0 grams of a mixture of 80% by weight powdered diatomaceous earth with an average particle size of less than 325 screen mesh, sold under the name Celite 266 by Johns-Manville, and 20% by weight powdered calcium silicate with an average particle size of less than 325 screen mesh, sold under the name Micro-Cel E by Johns-Manville. While agitating the particulate matter in the bag, 65.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 59.6% by 290° C.

EXAMPLE VII

The composition of matter was prepared by placing in a plastic bag 35.0 grams of a mixture of 80% by weight powdered diatomaceous earth with an average particle size of less than 150 screen mesh, sold under the name Celite 273 by Johns-Manville, and 20% by weight powdered calcium silicate with an average particle size of less than 325 screen mesh, sold under the name Micro-Cel E by Johns-Manville. While agitating the particulate matter in the bag, 65.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 61.8% by 290° C.

EXAMPLE VIII

The composition of matter was prepared by placing in a plastic bag 53.8 grams of powdered carbon black with an average particle size of less than 325 screen mesh. While agitating the particulate matter in the bag, 46.2 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 40.6% by 300° C.

EXAMPLE IX

The composition of matter was prepared by placing in a plastic bag 68.2 grams of powdered sodium montmorillonite with an average particle size of less than 200 screen mesh. While agitating the particulate matter in the bag, 31.2 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 32.0% by 300° C.

EXAMPLE X

The composition of matter was prepared by placing in a plastic bag 46.0 grams of powdered diatomaceous earth with an average particle size of less than 150 screen mesh, sold under the name Celite 273 by Johns-Manville. While agitating the particulate matter in the bag, 54.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 60.6% by 290° C.

EXAMPLE XI

The composition of matter was prepared by placing in a plastic bag 46.0 grams of a mixture of 60% by weight powdered diatomaceous earth with an average particle size of less than 150 screen mesh, sold under the name Celite 273 by Johns-Manville, and 40% by weight powdered calcium silicate with an average particle size of less than 325 screen mesh, sold under the name Micro-Cel E by Johns-Manville. While agitating the particulate matter in the bag, 54.0 grams of 93% concentrated sulfuric acid ($H_2SO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 54.1% by 275° C. and a weight loss of 60.0% by 950° C.

EXAMPLE XII

The composition of matter was prepared by placing in a plastic bag 63.0 grams of powdered diatomaceous earth with an average particle size of less than 325 screen mesh, sold under the name Celite 266 by Johns-Manville. While agitating the particulate matter in the bag, 37.0 grams of 85% concentrated phosphoric acid ($H_3PO_4$) was added drop by drop until no liquid was visible. A quantity of this composition was then subjected to a thermogravimetric analysis by using a differential thermal analyzer, DuPont 990 with a model 950 TGA module attached. The quantity of this composition was heated in 50° C. per minute increments from ambient to 1100° C. and had a weight loss of 10.2% by 150° C., a weight loss of 22.2% by 200° C., and a weight loss of 30.7% by 1025° C.

The invention having been described, what is claimed is:

1. A composition of matter to treat particles entrained in flue gas, comprising: a caustic liquid used to adjust resistivity of the entrained particles; and inert particulate matter supporting said caustic liquid for inhibiting chemical action of said caustic liquid until used to adjust the resistivity of the entrained particles, said inert particulate matter supporting sufficient caustic liquid to adjust the resistivity of the entrained particles.

2. A composition of matter as set forth in claim 1, further comprising: said caustic liquid being one or more acids selected from the group consisting of sulfuric and phosphoric acids.

3. A composition of matter as set forth in claim 2, further comprising: said particulate matter being one or more solid powders selected from the group consisting of calcium silicate, diatomaceous earth, vermiculite, magnesium silicate, sodium montmorillonite and carbon black.

4. A composition of matter as set forth in claim 1, further comprising: said particulate matter being one or more solid powders selected from the group consisting of calcium silicate, diatomaceous earth, vermiculite, magnesium silicate, sodium montmorillonite and carbon black.

5. A composition of matter as set forth in claim 1, further comprising: a weight ratio of said particulate matter to said caustic liquid being between 1:2 and 2:1.

6. A composition of matter as set forth in claim 5, further comprising: the weight ratio of said particulate matter to said caustic liquid being between 1:2 and 1:1.

7. A composition of matter as set forth in claim 1, further comprising: said caustic liquid being supported on said particulate matter by adsorption.

8. A composition of matter as set forth in claim 1, further comprising: said particulate matter has an average particle size of less than 100 screen mesh.

9. A composition of matter to treat particles entrained in flue gas, comprising: a caustic liquid used to adjust resistivity of the entrained particles, said liquid being one or more acids selected from the group consisting of sulfuric and phosphoric acids; and inert particulate matter adsorbing said caustic liquid for inhibiting chemical action of said caustic liquid until used to adjust the resistivity of the entrained particles, said particulate matter means being one or more solid powders selected from the group consisting of calcium silicate, diatomaceous earth, vermiculite, magnesium silicate, sodium montmorillonite and carbon black, and having an average particle size of less than 100 screen mesh and a weight ratio of said particulate matter to said caustic liquid between 1:2 and 1:1.

10. A method of removing entrained particles from flue gas, comprising the steps of: choosing a caustic liquid to adjust the resistivity of the entrained particles; supporting the caustic liquid on inert particulate matter to inhibit the chemical action of the caustic liquid, the inert particulate matter supporting sufficient caustic liquid to adjust the resistivity of the entrained particles; supplying the supported caustic liquid to untreated flue gas at a temperature sufficient to separate the caustic liquid from the inert particulate matter; mixing the separate caustic liquid with the entrained particles in the flue gas so as to coat the entrained particles with the caustic liquid; and passing the coated particles through an electrostatic precipitator to remove the particles from the flue gas.

11. A method as set forth in claim 10, further comprising the step of: said choosing the caustic liquid includes selecting one or more acids from the group consisting of sulfuric and phosphoric acids.

12. A method as set forth in claim 10, further comprising the step of: choosing the inert particulate matter from one or more solid powders selected from the group consisting of calcium silicate, diatomaceous earth, vermiculite, magnesium silicate, sodium montmorillonite and carbon black.

13. A method as set forth in claim 12, further comprising the step of: said choosing the caustic liquid includes selecting one or more acids from the group consisting of sulfuric and phosphoric acids.

14. A method as set forth in claim 10, further comprising the step of: said supporting the caustic liquid on the inert particulate matter being by adsorption.

15. A method as set forth in claim 10, further comprising the step of: said supporting the caustic liquid on the inert particulate matter includes a weight ratio of inert particulate matter to caustic liquid of between 1:2 to 2:1.

16. A method as set forth in claim 15, further comprising the step of: the weight ratio of inert particulate matter to caustic liquid being between 1:2 to 1:1.

17. A method as set forth in claim 10, further comprising the step of: said supplying the supported caustic liquid to untreated flue gas being at a temperature between 120° C. and 1200° C.

18. A method as set forth in claim 10, further comprising the step of: choosing the inert particulate matter from a particulate powder having an average particle size of less than 100 screen mesh.

19. A method of removing entrained particles from flue gas, comprising the steps of: choosing a caustic liquid to adjust the resistivity of the entrained particles, the chosen caustic liquid being one or more acids selected from the group consisting of sulfuric and phosphoric acids; supporting the caustic liquid on inert particulate matter to inhibit the chemical action of the caustic liquid, the caustic liquid being supported on the inert particulate matter by adsorption, the caustic liquid being supported on the inert particulate matter in a weight ratio of inert particulate matter to caustic liquid being between 1:2 and 1:1; choosing the inert particulate matter from one or more solid powders selected from the group consisting of calcium silicate, diatomaceous earth, vermiculite, magnesium silicate, sodium montmorillonite average particle size of less than 100 screen mesh; supplying the supported caustic liquid to untreated flue gas at a temperature between 120° C. and 1200° C. to separate the caustic liquid from the inert particulate matter; mixing the separated caustic liquid with the entrained particles in the flue gas so as to coat the entrained particles with the caustic liquid; and passing the coated particles through an electrostatic precipitator to remove the particles from the flue gas.

* * * * *